(12) United States Patent
Isaac et al.

(10) Patent No.: US 9,591,804 B2
(45) Date of Patent: Mar. 14, 2017

(54) OSCILLATING PAN OF AN AGRICULTURAL COMBINE HAVING A FLOW CONTROL GUIDE VANE

(71) Applicant: CNH Industrial America LLC, New Holland, PA (US)

(72) Inventors: Nathan E. Isaac, Lancaster, PA (US); Derek S. Rude, Muenster (CA); Joel M. McDonald, Humboldt (CA)

(73) Assignee: CNH Industrial America LLC, New Holland, PA (US)

( * ) Notice: Subject to any disclaimer, the term of this patent is extended or adjusted under 35 U.S.C. 154(b) by 135 days.

(21) Appl. No.: 14/385,703

(22) PCT Filed: Mar. 26, 2013

(86) PCT No.: PCT/US2013/033834
§ 371 (c)(1),
(2) Date: Sep. 16, 2014

(87) PCT Pub. No.: WO2013/148647
PCT Pub. Date: Oct. 3, 2013

(65) Prior Publication Data
US 2015/0111627 A1  Apr. 23, 2015

Related U.S. Application Data

(60) Provisional application No. 61/685,852, filed on Mar. 26, 2012.

(51) Int. Cl.
*A01D 41/12* (2006.01)

(52) U.S. Cl.
CPC .................. *A01D 41/1243* (2013.01)

(58) Field of Classification Search
USPC .......... 460/111, 112; 241/185.5, 186.2, 186.3
See application file for complete search history.

(56) References Cited

U.S. PATENT DOCUMENTS

| | | | |
|---|---|---|---|
| 2,969,862 A | 1/1961 | Worrell | |
| 3,186,460 A | 6/1965 | Frederick | |
| 4,212,142 A * | 7/1980 | Miner | A01D 43/10 |
| | | | 56/14.4 |
| 4,532,941 A * | 8/1985 | Gauthier | A01F 12/40 |
| | | | 241/243 |

(Continued)

FOREIGN PATENT DOCUMENTS

| | | | |
|---|---|---|---|
| DE | 4313841 A1 * | 11/1994 | A01F 12/40 |
| EP | 0212270 A1 | 3/1987 | |

*Primary Examiner* — Alicia Torres
(74) *Attorney, Agent, or Firm* — Peter K. Zacharias; Patrick M. Sheldrake (57) ABSTRACT

A chaff pan for attachment to a cleaning apparatus of an agricultural combine. The chaff pan includes a surface for receiving a flow of chaff from the cleaning apparatus. The surface has a proximal end proximate the combine and an opposing distal end. First and second side walls extend upwards from the surface about respective lateral ends of the chaff pan. The chaff pan also includes a flow control guide vane positioned on the surface of the chaff pan that extends from the proximal end to the distal end of the surface. The flow control guide vane is positioned on the surface at an angle relative to a midline of the chaff pan for directing the flow of chaff towards the midline of the chaff pan.

13 Claims, 7 Drawing Sheets

(56) References Cited

U.S. PATENT DOCUMENTS

| | | | |
|---|---|---|---|
| 5,082,186 A | 1/1992 | Bruns | |
| 6,554,701 B1 | 4/2003 | Wolters | |
| 6,582,298 B2 | 6/2003 | Wolters | |
| 6,866,580 B2 * | 3/2005 | Weichholdt | A01F 12/40 460/112 |
| 7,156,732 B2 * | 1/2007 | Kuhn | A01D 41/1243 460/111 |
| 7,186,179 B1 | 3/2007 | Anderson et al. | |
| 7,220,179 B2 | 5/2007 | Redekop et al. | |
| 7,559,833 B2 | 7/2009 | Isaac et al. | |
| 8,152,609 B2 | 4/2012 | Benes et al. | |
| 8,585,475 B2 | 11/2013 | Isaac et al. | |
| 2011/0053667 A1 * | 3/2011 | Benes | A01D 41/1243 460/111 |

* cited by examiner

OSCILLATING PAN OF AN AGRICULTURAL COMBINE HAVING A FLOW CONTROL GUIDE VANE

CROSS REFERENCE TO RELATED APPLICATIONS

This application is the US National Stage filing of International Application Serial No. PCT/US2013/033834 filed on Mar. 26, 2013 which claims priority to U.S. Provisional Patent Application No. 61/685,852, filed Mar. 26, 2012, entitled OSCILLATING PAN OF AN AGRICULTURAL COMBINE HAVING A FLOW CONTROL GUIDE VANE, each of which is hereby incorporated by reference in its entirety.

BACKGROUND OF THE INVENTION

The present invention relates generally to an oscillating pan or chaff pan of an agricultural combine. In particular, the present invention relates to an oscillating pan of an agricultural combine having a flow control guide vane for directing flow along the oscillating pan.

Agricultural combine harvesting machines or harvesters typically discharge crop residue, or processed crop material, from a rear cavity of the harvester. Crop residue is typically generated by two sources. One source is the threshing and separating system, which produces a large volume of crop residue, typically including larger fragments of stalks, stems, cobs, and leaves, often referred to as straw or straw residue. The other source is the cleaning system, which produces a much lower volume of smaller elements of crop residue, such as pod and husk fragments, and particulates, commonly referred to as chaff or chaff residue. Both sources are typically propelled rearwardly through the rear cavity of the harvesting machine, and discharged through a rear opening in some manner.

Rotary residue spreaders typically include counter rotating disks or impellers for receiving all or part of the processed crop material or residue from the rear cavity of a combine harvester and spreading the material in a generally even side to side manner behind the harvester. In some styles of spreaders, known generally as vertical spreaders, the impellers are oriented generally vertically or at a small acute angle relative to vertical, so as to rotate about a horizontal or near horizontal rotational axis. In other spreaders, known generally as horizontal spreaders, the disks are oriented generally horizontally, for rotation about upstanding or vertical rotational axes.

In operation, the spreaders are designed to spread grain/chaff from the combine's cleaning system. However, in typical use, spreading via conventional spreaders has often resulted in a poor spread with grain loss concentrated within a single band along a path of travel of the combine. Poor spread results, in part, as conventional chaff pans fail to adequately deliver chaff/grain to the combine's spreader. As a result, the grain discharged from the combine will subsequently sprout and give the appearance of poor combine operating conditions.

Thus, there is still a need for a combine with a spreader/discharge system capable of increasing or maximizing spreading of free grain and/or chaff from the combine. Such a need is satisfied by the chaff pan of the present invention.

BRIEF SUMMARY OF THE INVENTION

In accordance with a preferred embodiment, the present invention provides a chaff pan for attachment to a cleaning apparatus of an agricultural combine. The chaff pan includes a surface for receiving a flow of chaff from the cleaning apparatus. The surface has a proximal end proximate the combine and an opposing distal end. First and second side walls extend upwards from the surface about respective lateral ends of the chaff pan. The chaff pan also includes a flow control guide vane positioned on the surface of the chaff pan extending from the proximal end to the distal end. The flow control guide vane is positioned on the surface at an angle relative to a midline of the chaff pan for directing the flow of chaff towards the midline of the chaff pan.

In accordance with another preferred embodiment, the present invention provides a chaff pan for receiving a flow of chaff from a cleaning apparatus of an agricultural combine. The chaff pan includes a surface having a larger proximal end than an opposing distal end of the surface. First and second side walls extending from the surface about respective lateral ends of the chaff pan. The chaff pan also includes a flow control guide vane positioned on the surface of the chaff pan extending from the proximal end to the distal end. The proximal end of the flow control guide vane is spaced further from a midline of the chaff pan than the distal end of the flow control guide vane is spaced from the midline of the chaff pan.

In accordance with yet another preferred embodiment, the present invention provides a chaff pan for receiving a flow of chaff from a cleaning apparatus of an agricultural combine. The chaff pan includes a surface having a larger proximal end than an opposing distal end of the surface. First and second side walls extending from the surface about respective lateral ends of the chaff pan. The chaff pan also includes a flow control guide vane positioned on the surface of the chaff pan. The flow control guide vane includes a proximal end proximate the proximal end of the surface and an opposing distal end, and a plurality of spaced apart and overlapping guide vane segments extending from the proximal end to the distal end of the surface. The plurality of guide vane segments is configured to direct a flow of chaff towards a midline of the chaff pan as the flow of chaff flows towards the distal end of the chaff pan.

BRIEF DESCRIPTION OF THE SEVERAL VIEWS OF THE DRAWINGS

The foregoing summary, as well as the following detailed description of the preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain," "tailing," "chaff" and "crop material" are used throughout the specification for convenience and it should be understood that these terms are not intended to be limiting. Thus, "chaff" refers to that part of harvested and separated materials being discharged from the combine, including free grain.

Figure 1:
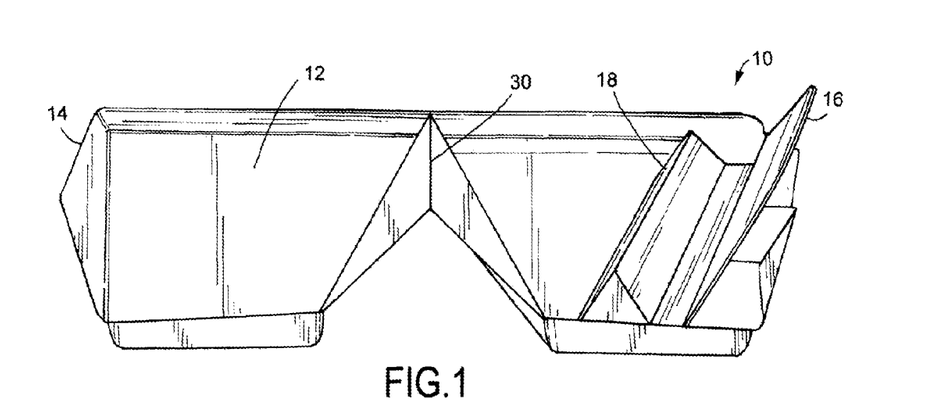
FIG. 1 is a perspective view of a chaff pan for an agricultural combine in accordance with a preferred embodiment of the present invention.
Figure 1A:
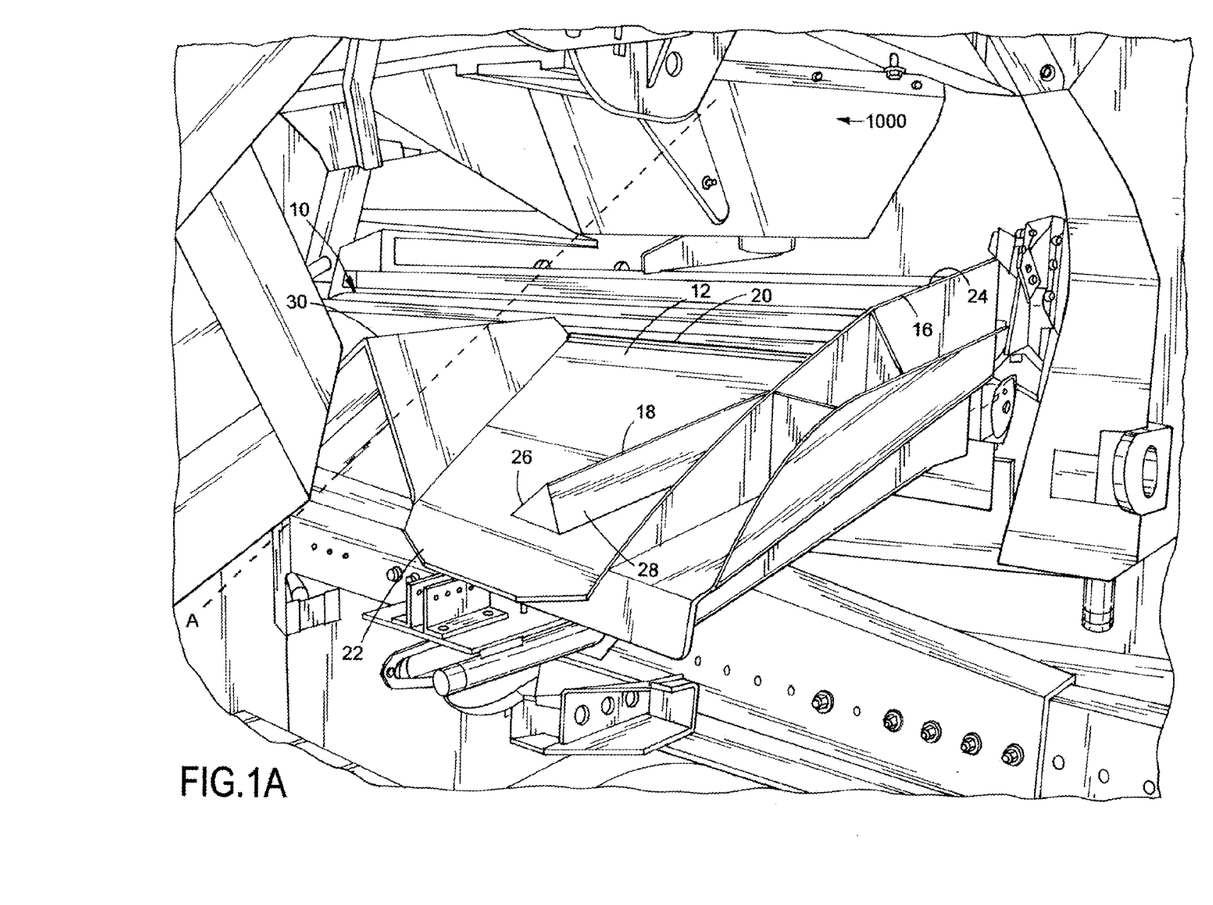
FIG. 1A is a perspective view of the chaff pan of FIG. 1 attached to an agricultural combine.

In accordance with a first preferred embodiment, the present invention provides for a chaff pan 10, as shown in FIG. 1, for attachment to a cleaning apparatus of an agricultural combine 1000 (FIG. 1A). The chaff pan 10 includes a surface 12 for receiving a flow of grain/chaff from the cleaning apparatus, a first side wall 14 and a second side wall 16 extending from the surface 12, a flow control guide vane 18 positioned on the surface 12, and a spine 30.

The chaff pan 10 is configured, as best shown in FIG. 1, and when assembled to a combine 1000 extends outwardly and downwards therefrom (FIG. 1A). Overall, the chaff pan 10 in configured as a substantially planar pan, which forms the surface 12, having the first and second side walls 14, 16 extending upwardly therefrom. That is, the first and second side walls 14, 16 extend upwardly from the surface 12 about respective lateral ends of the chaff pan 10. The first and second side walls 14, 16 can be configured to extend substantially vertically from a horizontal, but are preferably configured to extend upwards and laterally away from a midline of the chaff pan 10, as shown in FIG. 1. The height of the side walls 14, 16 can be configured to be at least as tall as the amount the distal end of the chaff pan 10 extends downwardly from the combine. That is, for example, an upper edge 24 of the side wall 16 is configured to be substantially parallel to the horizontal when the chaff pan 10 is assembled to the combine 1000.

Referring to FIG. 1A, the chaff pan 10 has a proximal end 20 adjacent the combine 1000 and a distal end 22 opposite the proximal end 20 and further away from the combine 1000 than the proximal end 20. The width of the proximal end 20 is larger than the width of the distal end 22. Consequently, the surface 12 has a proximal end proximate the combine 1000 with a width that is larger than a width of an opposing distal end of the surface 12. In other words, the overall profile of the surface 12 is configured to have a trapezoidal shape.

The spine 30 is an upwardly extending spine that extends upwards from about a midline of the chaff pan 10 from the proximal end 20 to the distal end 22 of the chaff pan 10. The spine 30 is also configured substantially as an inverted V-shaped spine that slopes upwards from the proximal end 20 to the distal end 22 relative to the surface 12 of the chaff pan 10. The overall width of the spine 30 also increases from the proximal end to the distal end of the spine 30.

The flow control guide vane 18 is positioned on the surface 12 of the chaff pan 10 and extends from the proximal end 20 of the chaff pan 10 to the distal end 22 or adjacent the distal end 22 of the chaff pan 10. The flow control guide vane 18 is also positioned along the surface 12 of the chaff pan 10 at an angle relative to a midline A and between the spine 30 and second side wall 16. Additionally, the flow control guide vane 18 is positioned so as to be spaced from one of the side walls further than the opposite side wall. As such, the flow control guide vane 18 directs the flow of chaff towards the midline of the chaff pan 10, which thereby allows for the discharge of chaff to desired or optimum locations about the spreader's impeller for improved spreading of chaff from the combine 1000.

Figure 1B:
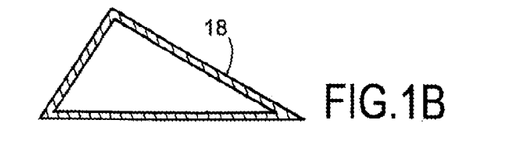
FIG. 1B is a schematic cross-sectional view of a flow control guide vane in accordance with another aspect of the embodiment of FIG. 1 taken along a plane perpendicular to a longitudinal axis of the flow control guide vane.

As shown in FIGS. 1 and 1A, the flow control guide vane 18 can be configured to have a triangular cross-section with equilateral sides, but is preferably configured to have a triangular cross-section with no equal sides or angles, i.e., in the form of a scalene triangle (FIG. 1B). The flow control guide vane 18 includes a medial surface 26 and a lateral surface 28. The medial surface 26 faces towards the midline while the lateral surface 28 faces away from the midline. The medial surface 26 preferably forms an obtuse angle with respect to the surface 12 of the chaff pan 10. Further, the lateral surface 28 preferably forms an obtuse angle with respect to the surface 12 of the chaff pan 10. More preferably, the medial surface 26 of the flow control guide vane 18 is at an angle from about 91 to 120 degrees from the surface 12 of the chaff pan 10 and the lateral surface 28 of the flow control guide vane 18 is at an angle from about 91 to 150 degrees from the surface 12 of the chaff pan 10.

Preferably, the flow control guide vane 18 has a proximal end adjacent the proximal end of the surface 12 and a distal end adjacent the distal end of the surface 12. Furthermore, the proximal end of the flow control guide vane 18 is spaced further from the midline A of the chaff pan 10 than the distal end of the flow control guide vane 18 is spaced from the midline A of the chaff pan 10. Alternatively, the distal end of the flow control guide vane 18 can be optionally placed at the midline A of the chaff pan 10 and the proximal end of the flow control guide vane 18 spaced from the midline A of the chaff pan 10.

The overall height of the flow control guide vane 18 is less than the overall height of the first and second side walls 14, 16. Preferably, the height of the flow control guide vane 18 is about three to four inches from the surface 12.

Figure 1C:
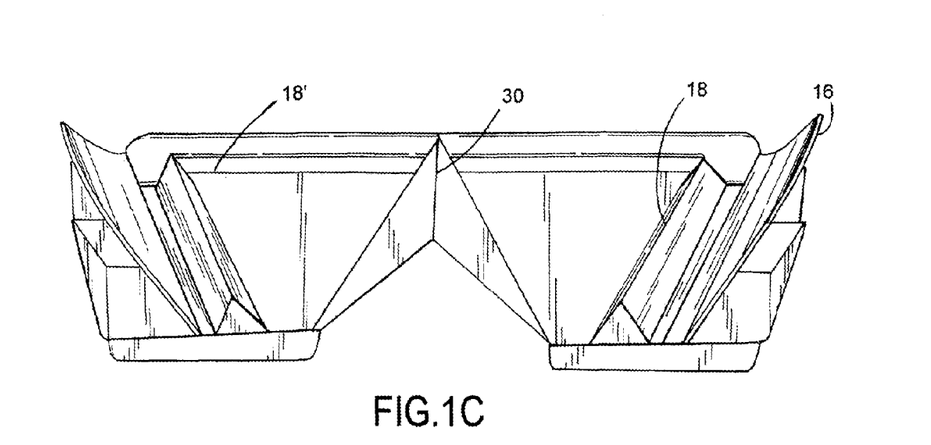
FIG. 1C. is a perspective view of the chaff pan of FIG. 1 with a pair of flow control guide vanes.

Preferably, the chaff pan 10 includes a pair of flow control guide vanes 18, 18' that is symmetric about the spine 30 or midline A, as shown in FIG. 1C.

Figure 2:
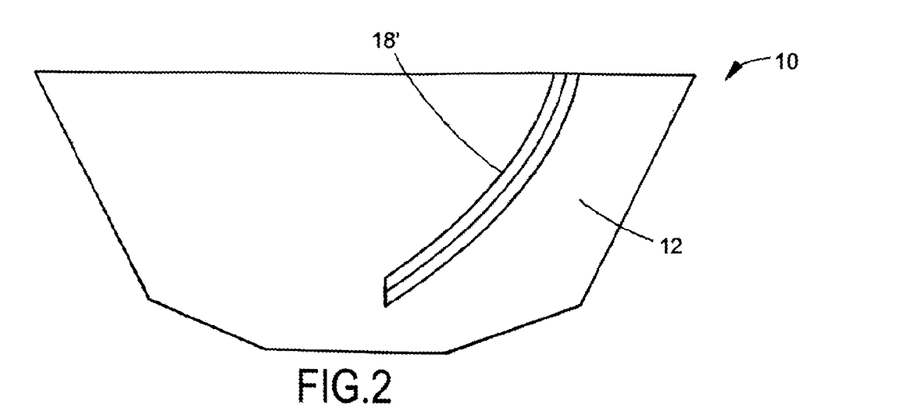
FIG. 2 is a simplified schematic top plan view of an alternative aspect of the chaff pan showing a curved flow control guide vane.

Referring to FIG. 2, in accordance with another aspect of the first preferred embodiment, the flow control guide vane 18 can be configured as a curved flow control guide vane 18". The curved flow control guide vane 18" is configured to direct the flow of chaff towards the midline of the chaff pan 10.

Figure 3:
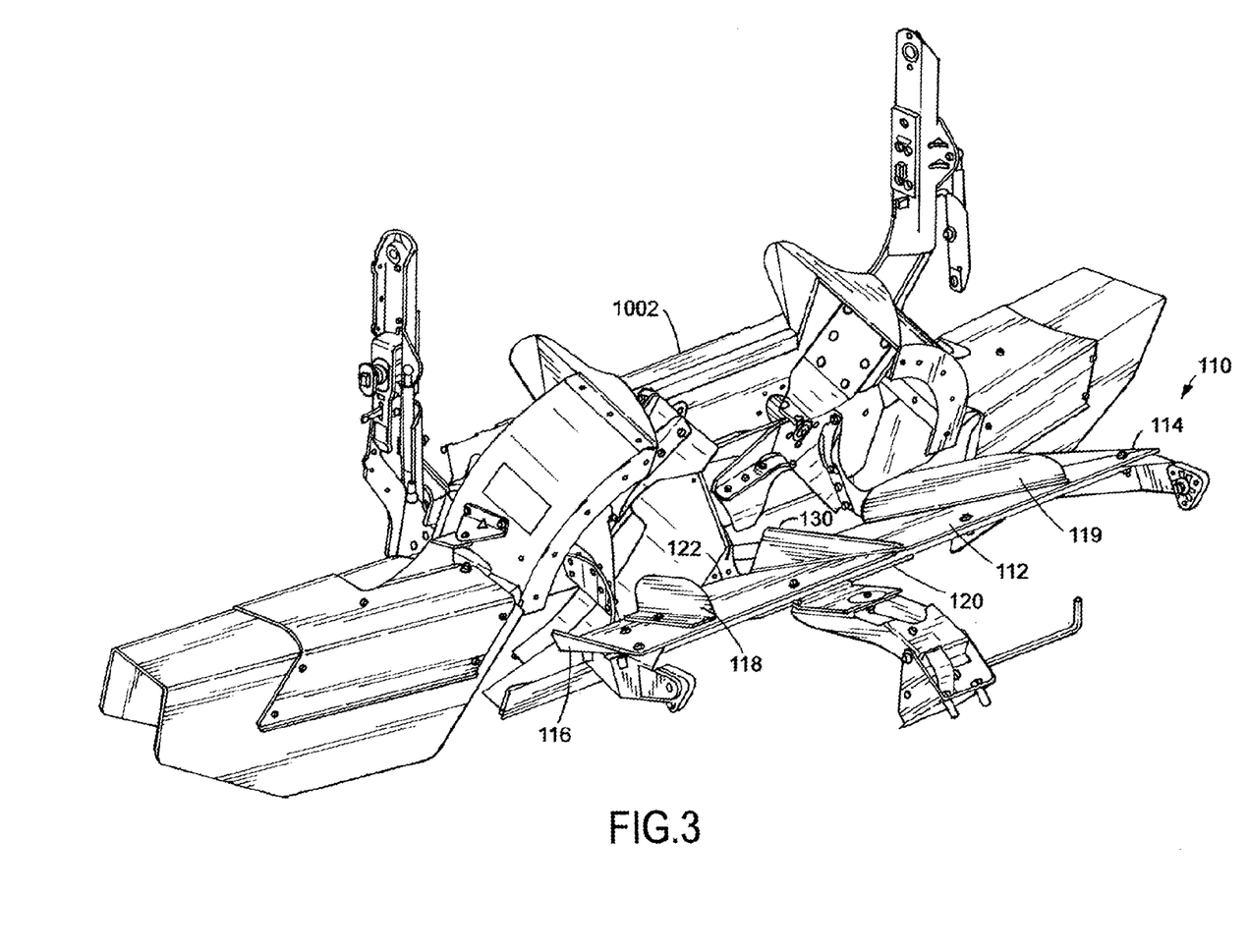
FIG. 3 is a perspective view of a chaff pan in accordance with another preferred embodiment of the present invention adjacent a vertical spreader of an agricultural combine.
Figure 4:
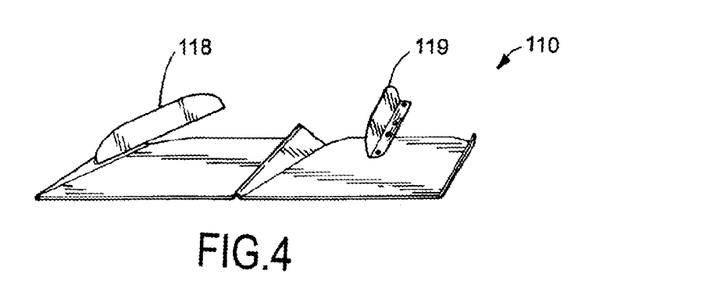
FIG. 4 is another perspective view of the chaff pan of FIG. 3.

In accordance with a second preferred embodiment, the present invention provides for a chaff pan 110, as shown in FIGS. 3 and 4, for attachment to a cleaning apparatus of the agricultural combine 1000. Similar to chaff pan 10, chaff pan 110 includes a surface 112 for receiving a flow of grain/chaff from the cleaning apparatus, a first side wall 114 and a second side wall 116 extending from the surface 112, and a first flow control guide vane 118 positioned on the surface 112.

The chaff pan 110 also includes a spine 130 extending upwards from a midline of the chaff pan 110 and a second flow control guide vane 119. The spine 130 is an elongated raised spine and configured substantially as an inverted V-shaped spine that slopes upwards from the proximal end 120 to the distal end 122 of the chaff pan 110. The overall width of the spine 130 also increases from the proximal end to the distal end of the spine 130. The second flow control guide vane 119 is positioned on the surface 112 about an opposite side of the midline than where the first flow control guide vane 118 is positioned on the surface 112. Collectively, the first and second flow control guide vanes 118, 119 effectively funnel the flow of chaff received by the chaff pan 110 so as to discharge the chaff more towards a midline region of the chaff pan 110. Thus, in operation, the chaff pan 110 effectively directs the flow of chaff exiting the chaff pan 110 towards a medial section of the combine's spreader 1002 (FIG. 3).

Figure 5:
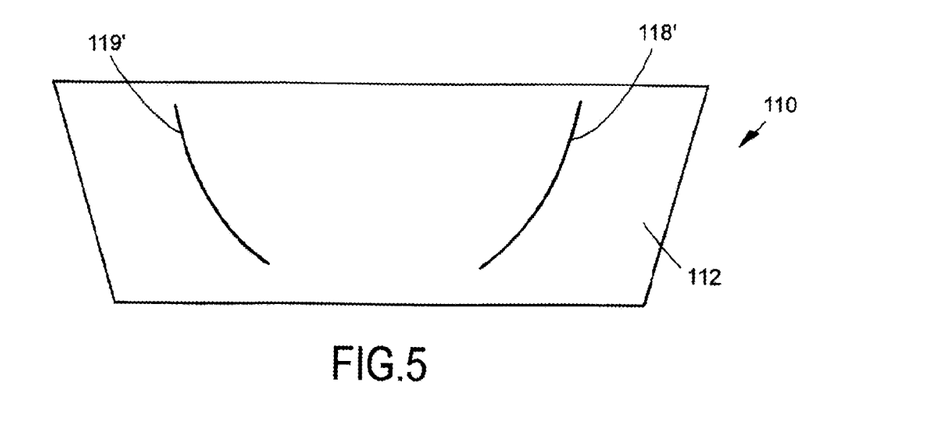
FIG. 5 is a simplified schematic top plan view of an alternative aspect of the chaff pan of FIG. 3 showing a curved flow control guide vane.

The first and second flow control guide vanes 118, 119 are preferably configured as planar guide vanes that extend upwards from the surface 112 at a height substantially equal to or greater than the height of the spine 130, but can alternatively be configured with a height less than the height of the spine 130. Further, similar to the curved flow control guide vane 18', each of the first and second flow control guide vanes can be configured as curved flow control guide vanes 118', 119' (FIG. 5) that are oriented to curve inwards towards the midline from the proximal end 120 to the distal end 122.

Figure 6:
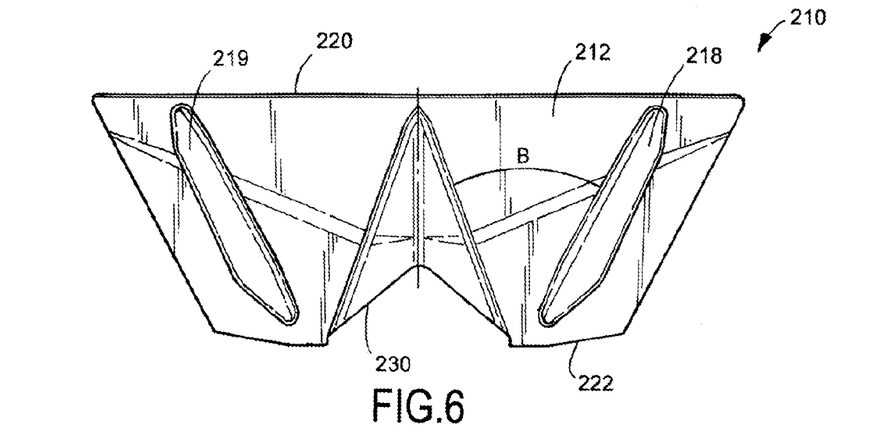
FIG. 6 is a top plan view of a chaff pan in accordance with yet another preferred embodiment of the present invention.
Figure 7:
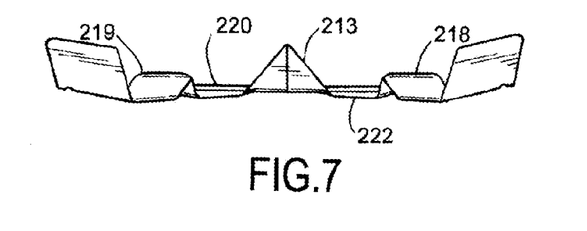
FIG. 7 is a rear elevation view of the chaff pan of FIG. 6.

In accordance with a third preferred embodiment, the present invention provides for a chaff pan 210, as shown in FIGS. 6 and 7, for attachment to a cleaning apparatus of the agricultural combine 1000. Similar to chaff pan 110, chaff pan 210 includes a surface 212 for receiving a flow of grain/chaff from the cleaning apparatus, a first flow control guide vane 218, a second flow control guide vane 219, and a spine 230. Preferably, the first flow control guide vane 218, the second flow control guide vane 219, and the spine 230 are each integrally formed on the chaff pan 210.

Similar to the second preferred embodiment, the first and second flow control guide vanes 218, 219 are positioned on opposite sides of the spine 230 and oriented to deflect a flow of chaff towards the midline of the chaff pan 210. The spine 230 is configured to be an elongated raised spine and configured substantially as an inverted V-shaped spine that slopes upwards from the proximal end 220 to the distal end 222 of the chaff pan 210 and has a height significantly greater than the height of the first and second flow control guide vanes 218, 219, but can alternatively be configured to have a height less than or equal to the height of the flow control guide vanes 218, 219. The width of the spine 230 also significantly increases moving from the proximal end to the distal end of the spine 230. Preferably, the width of the distal end of the spine 230 is approximately one half the overall width of the chaff pan's distal end 222.

Each of the first and second flow control guide vanes 218, 219 are preferably configured as straight elongated guide vanes. Each flow control guide vane is also positioned on the surface 212 at an angle B from a facing wall of the spine 230 of about 20 to 45 degrees, but can alternatively be configured more or less than 20 to 45 degrees, such as 15, 25, 30, 35 and 50 degrees. Thus, the combination of the spine 230 and the first and second flow control guide vanes 218, 219 forms a dual funnel for directing the flow of chaff through the chaff pan 210 and towards a mid-region of a corresponding spreader.

Figure 8:
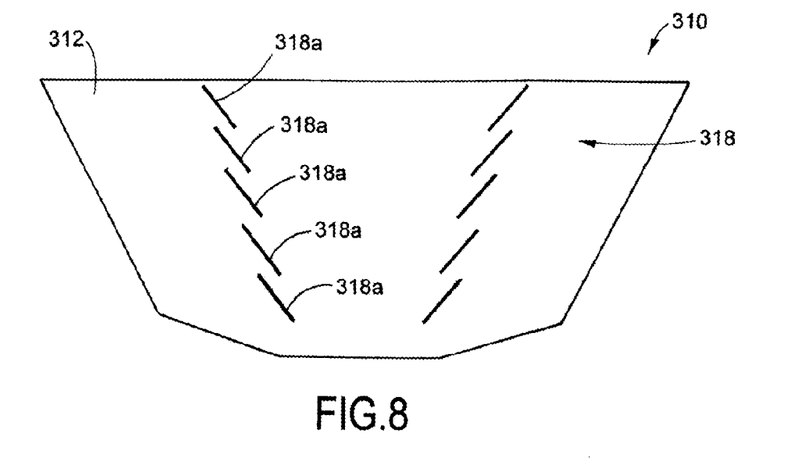
FIG. 8 is a simplified schematic top plan view of a flow control guide vane of a chaff pan in accordance with another preferred embodiment of the present invention.

In accordance with a fourth preferred embodiment, the present invention provides for a chaff pan 310, as shown in FIG. 8, for attachment to a cleaning apparatus of the agricultural combine 1000. The chaff pan 310 can be configured similar to any of the above chaff pan embodiments, but includes a segmented flow control guide vane 318. The segmented flow control guide vane 318 includes a plurality of overlapping guide vane segments 318a, which are slightly spaced apart from an adjacent guide vane segment 318a. The segmented flow control guide vane 318 is positioned on the surface 312 of the chaff pan 310 so as to direct or deflect the flow of chaff towards the midline of the chaff pan 310. Furthermore, the chaff pan 310 is configured to have a series of segmented flow control guide vanes that direct the flow of chaff towards the midline of the chaff pan 310 about opposite sides of the midline of the chaff pan 310 i.e., a pair of segmented flow control guide vane assemblies.

EXAMPLES

The present invention will be better understood by reference to the following examples, which are provided by way of illustration and not by way of limitation.

Control Sample

Figure 9:
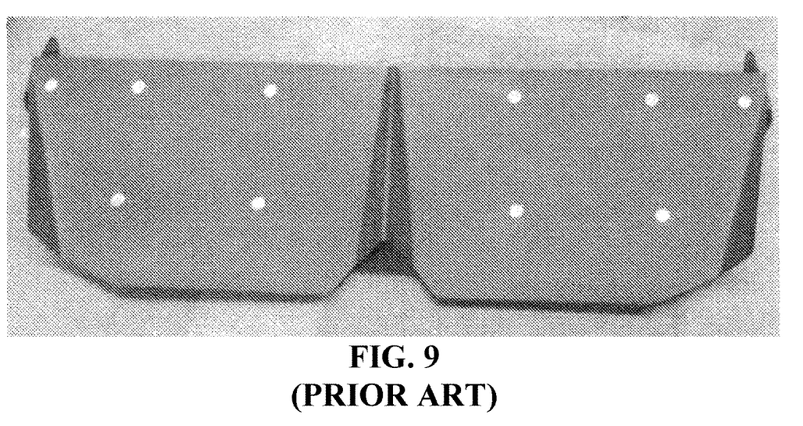
FIG. 9 illustrates a conventional production flat pan evaluated for grain loss.

A conventional production flat pan i.e., conventional chaff pan, was evaluated and compared to chaff pans embodying the present invention. FIG. 9 illustrates the conventional production flat pan used as a control for measuring improvement in grain loss from a combine harvester.

Example I

Figure 10:
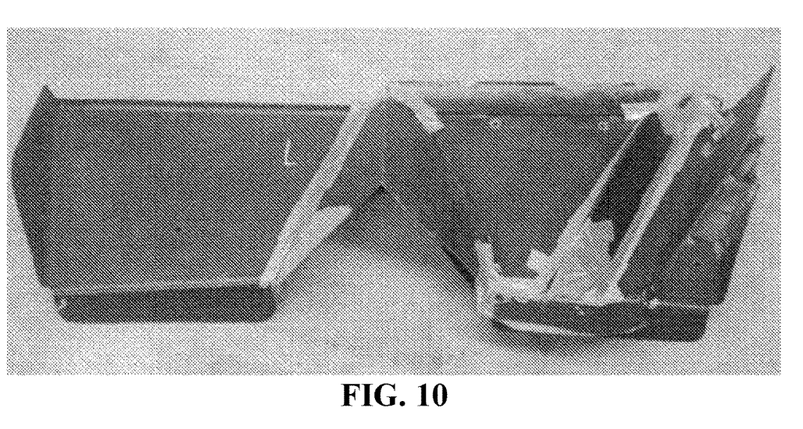
FIG. 10 illustrates a modified chaff pan evaluated for improvement in grain loss, in accordance with an exemplary embodiment of the present invention.

A modified chaff pan as shown in FIG. 10 was evaluated for improvement in grain loss during operation of a combine harvester. The modified chaff pan was designed with an enlarged spine and a flow control guide vane about a right side of the chaff pan, i.e., positioned intermediate the spine and the right upwardly extending wall plate.

Example II

Figure 11:
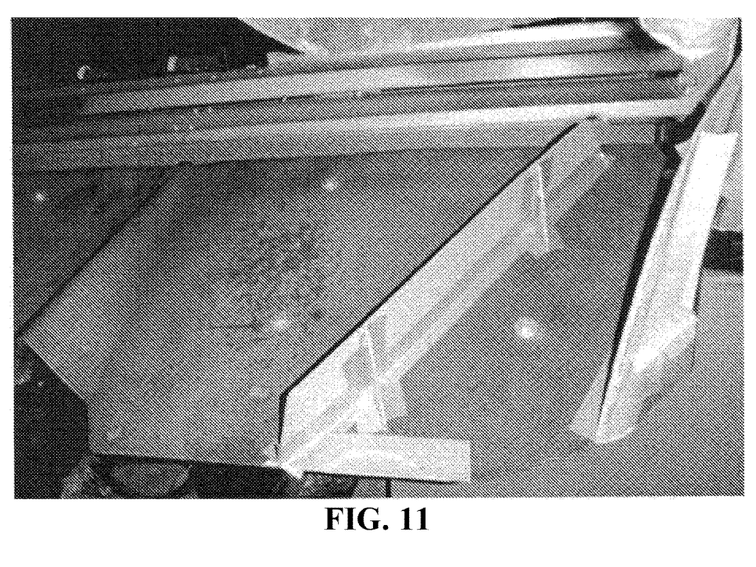
FIG. 11 illustrates another modified chaff pan evaluated for improvement in grain loss, in accordance with an exemplary embodiment of the present invention.

A modified chaff pan as shown in FIG. 11 was evaluated for improvement in grain loss during operation of a combine harvester. The modified chaff pan was designed with a flow control guide vane about a right side of a conventional chaff pan, as shown e.g., in FIG. 9. The flow control guide vane was positioned intermediate the spine and the right upwardly extending wall plate.

Evaluation Results

Grain Loss at Center, i.e., grain loss at the center of a spreader being fed by a chaff pan, and Grain Loss at Right Edge, i.e., grain loss at the right edge of a spreader being fed by a chaff pan were evaluated under simulated normal operating conditions for the discharge of chaff. Table 1 below is a table of the improvement in percentage spread of grain from both the Grain Loss at Center and Grain Loss at Right Edge positions of the combine's spreader. Percentage spread to side was determined by the amount of grain collected that was spread to outside the right, rear tire of the combine.

TABLE 1

|  | Grain Loss At Center | | Grain Loss at Right Edge | |
| --- | --- | --- | --- | --- |
|  | % Spread to Side | % Increase over Control | % Spread to Side | % Increase over Control |
| Control | 22 |  | 15 |  |
| Example I | 69 | 47 | 60 | 45 |
| Example II | 63 | 41 | 49 | 34 |

It will be appreciated by those skilled in the art that changes could be made to the embodiments described above without departing from the broad inventive concept thereof. It is to be understood, therefore, that this invention is not limited to the particular embodiments disclosed, but it is intended to cover modifications within the spirit and scope of the present invention as defined by the appended claims.

We claim:

1. A chaff pan for attachment to a cleaning apparatus of an agricultural combine, the chaff pan comprising:
   a surface for receiving a flow of chaff from the cleaning apparatus, the surface having a proximal end and an opposing distal end;
   first and second side walls extending upwards from the surface about respective lateral ends of the chaff pan; and
   a flow control guide vane positioned on the surface of the chaff pan and extending from the proximal end to the distal end, wherein the flow control guide vane is positioned on the surface at an angle relative to a midline of the chaff pan for directing the flow of chaff towards the midline of the chaff pan, the flow control guide vane comprising:
      a medial surface at an obtuse angle from the surface of the chaff pan, and
      a lateral surface at an obtuse angle from the surface of the chaff pan.

2. The chaff pan of claim 1, wherein the flow control guide vane is spaced from one of the side walls further than the opposite side wall.

3. The chaff pan of claim 1, wherein the proximal end of the surface has a width larger than a width of the distal end of the surface.

4. The chaff pan of claim 1, wherein the chaff pan extends outwardly and downwards from the proximal end to the distal end.

5. The chaff pan of claim 1, wherein the medial surface of the flow control guide vane is at an angle from about 91 to 120 degrees from the surface of the chaff pan, and wherein the lateral surface of the flow control guide vane is at an angle from about 91 to 150 degrees from the surface of the chaff pan.

6. The chaff pan of claim 1, wherein the flow control guide vane has a proximal end adjacent the proximal end of the surface and a distal end adjacent the distal end of the surface, and wherein the proximal end of the flow control guide vane is spaced further from the midline of the chaff pan than the distal end of the flow control guide vane is spaced from the midline of the chaff pan.

7. The chaff pan of claim 1, wherein the flow control guide vane is a curved flow control guide vane.

8. The chaff pan of claim 1, further comprising a second flow control guide vane positioned on the surface of the chaff pan on an opposite side of the midline of the chaff pan from which the flow control guide vane is positioned.

9. The chaff pan of claim 1, further comprising an elongated raised spine extending along the midline of the chaff pan.

10. A chaff pan for receiving a flow of chaff from a cleaning apparatus of an agricultural combine, the chaff pan comprising:
   a surface having a larger proximal end than an opposing distal end of the surface;
   first and second side walls extending from the surface about respective lateral ends of the chaff pan; and
   a flow control guide vane positioned on the surface of the chaff pan and extending from the proximal end to the distal end, wherein the proximal end of the flow control guide vane is spaced further from a midline of the chaff pan than the distal end of the flow control guide vane is spaced from the midline of the chaff pan, the flow control guide vane comprising:
      a medial surface at an obtuse angle from the surface of the chaff pan, and
      a lateral surface at an obtuse angle from the surface of the chaff pan.

11. The chaff pan of claim 10, further comprising a second flow control guide vane positioned on the surface of the chaff pan on an opposite side of the midline of the chaff pan from which the flow control guide vane is positioned.

12. The chaff pan of claim 10, wherein the medial surface of the flow control guide vane is at an angle from about 91 to 120 degrees from the surface of the chaff pan, and wherein the lateral surface of the flow control guide vane is at an angle from about 91 to 150 degrees from the surface of the chaff pan.

13. The chaff pan of claim 10, wherein the flow control guide vane is a curved flow control guide vane.

* * * * *